No. 818,900. PATENTED APR. 24, 1906.
A. MAST.
CAR WHEEL.
APPLICATION FILED JAN. 2, 1906.
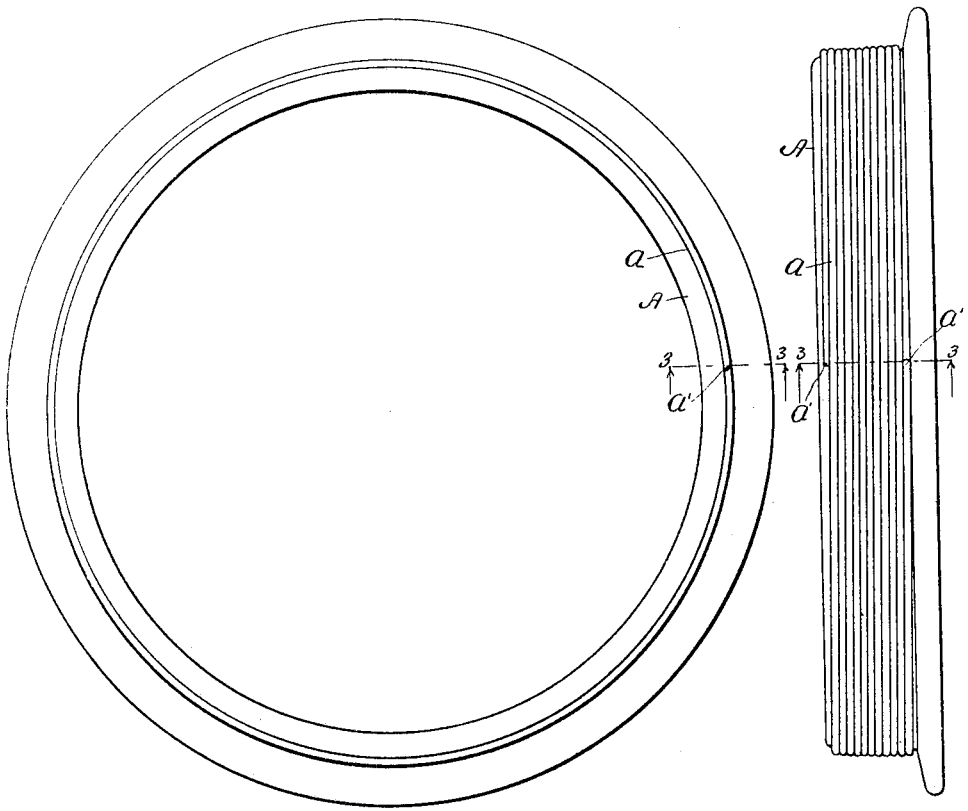
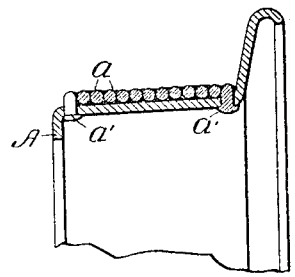
Witnesses:
Inventor.
Aaron Mast
By Chappell & Earl
Att'ys

UNITED STATES PATENT OFFICE.

AARON MAST, OF ANNAPOLIS, MISSOURI, ASSIGNOR TO SHEFFIELD CAR COMPANY, OF THREE RIVERS, MICHIGAN.

CAR-WHEEL.

No. 818,900.     Specification of Letters Patent.     Patented April 24, 1906.

Application filed January 2, 1906. Serial No. 294,248.

*To all whom it may concern:*

Be it known that I, AARON MAST, a citizen of the United States, residing at Annapolis, county of Iron, State of Missouri, have invented certain new and useful Improvements in Car-Wheels, of which the following is a specification.

This invention relates to improvements in car-wheels.

The objects of this invention are, first, to provide an improved car-wheel having good tractive or traction qualities and at the same time one which is very durable; second, to provide an improved car-wheel which is practically noiseless; third, to provide an improved car-wheel having these advantages which is economical to produce and very durable.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a side elevation of a structure embodying the features of my invention. Fig. 2 is a plan thereof. Fig. 3 is an enlarged detail cross-section taken on a line corresponding to line 3 3 of Figs. 1 and 2.

In the drawings similar letters of reference refer to similar parts throughout the several views.

Referring to the drawings, A is the rim portion of a car-wheel. As the web or spoke and hub portions form no part of this invention, I have not illustrated the same herein. The tread portion of my improved car-wheel is provided with a tire or covering consisting, preferably, of a single or continuous strand of wire wound peripherally thereon. The rim A is preferably provided with holes $a'$ near its edges, in which the ends of the wire are secured. (See Fig. 3.)

In the manufacture of my improved car-wheel I preferably secure one end of the wire in the hole adjacent to the rim and by revolving the wheel wind the wire tightly upon the tread, the other end of the wire being secured in the opposite hole in the rim. This forms a convenient means of securing the covering or tire to the tread. In the preferred construction the coils of wire are secured together by a coating of solder, although the structure is entirely practical with the solder omitted. The solder, however, adds somewhat to the durability of the covering and also adds to its noiseless quality.

My improved wheel has very good tractive or traction qualities, at the same time is very durable. It is also very quiet, possessing many of the advantages of the rubber tire, and at the same time being very economical and durable. It also adds very greatly to the life of the wheel, as the same is fully protected, and the tire or covering can be economically renewed in the event of the same wearing out or being injured by accident.

Having thus described my invention, what I claim as new, and desire to secure by Letters Patent, is—

1. In a wheel, the combination of a metal rim having holes therethrough near its edges; a covering for the tread portion thereof consisting of a single or continuous strand of wire wound peripherally thereon, the ends of said wire being secured in said holes in said rim; and a coating of solder for said wire.

2. In a wheel, the combination of a metal rim having holes therethrough near its edges; a covering for the tread portion thereof, consisting of a single or continuous strand of wire wound peripherally thereon, the ends of said wire being secured in said holes in said rim, the coils of said wire being soldered together.

3. In a wheel, the combination of a metal rim having holes therethrough near its edges; a covering for the tread portion thereof, consisting of a single or continuous strand of wire wound peripherally thereon, the ends of said wire being secured in said holes in said rim.

4. In a wheel, the combination of a rim; a covering for the tread portion thereof, consisting of wire wound peripherally thereon; and a coating of solder for said wire.

5. In a wheel, the combination of a rim; a covering for the tread portion thereof, consisting of wire wound peripherally thereon, the coils of said wire being soldered together.

6. In a wheel, the combination of a rim; a covering for the tread thereof, consisting of wire wound thereon.

In witness whereof I have hereunto set my hand and seal in the presence of two witnesses.

AARON MAST. [L. s.]

Witnesses:
CHARLES E. BOLCH,
W. M. LOOMIS.